US007616757B2

(12) United States Patent
Erdman

(10) Patent No.: US 7,616,757 B2
(45) Date of Patent: Nov. 10, 2009

(54) SCALABLE CALL CENTER TELECOMMUNICATIONS SYSTEM

(76) Inventor: Joseph L. Erdman, 1501 Pennsylvania Ave., St. Albans, WV (US) 25177

( * ) Notice: Subject to any disclaimer, the term of this patent is extended or adjusted under 35 U.S.C. 154(b) by 1249 days.

(21) Appl. No.: 10/930,006

(22) Filed: Aug. 30, 2004

(65) Prior Publication Data

US 2006/0045256 A1    Mar. 2, 2006

(51) Int. Cl.
*H04M 3/00* (2006.01)
(52) U.S. Cl. ............................. 379/266.07; 379/265.01
(58) Field of Classification Search ............ 379/265.01, 379/266.07
See application file for complete search history.

(56) References Cited

U.S. PATENT DOCUMENTS

| | | | |
|---|---|---|---|
| 4,645,879 A | 2/1987 | Simmons | |
| 4,731,826 A | 3/1988 | Daie | |
| 4,865,848 A | 9/1989 | Cheng et al. | |
| 4,870,677 A | 9/1989 | Di Santo et al. | |
| 4,873,720 A | 10/1989 | Son | |
| 5,029,202 A | 7/1991 | Doernbach, Jr. et al. | |
| 5,937,057 A * | 8/1999 | Bell et al. | 379/265.02 |
| 5,995,614 A * | 11/1999 | Miloslavsky | 379/265.11 |

\* cited by examiner

*Primary Examiner*—Rasha S Al Aubaidi
(74) *Attorney, Agent, or Firm*—Tarolli, Sundheim, Covell & Tummino LLP

(57) ABSTRACT

A telecommunications system for a call center. In one preferred embodiment, the telecommunications system includes a plurality of call stations coupled in a peer-to-peer network, each of the call stations includes a host computer and a scalable telecommunication management apparatus (STMA) in communication with the computer and providing for inbound and outbound calling activities. The call center telecommunications system is scalable meaning the number of call stations, each of which comprises a host computer and one or more STMAs, may be easily increased or decreased depending on the volume of calls without the need for expensive restructuring of the telecommunications system. Advantageously, the STMAs are embodied in circuit cards plugged into respective expansion slots of the host computer and the host computer is a personal computer. Information regarding incoming and outgoing calls of the call center is conveyed to an operator of the call station via audio and visual presentation.

2 Claims, 9 Drawing Sheets

SCALABLE CALL CENTER TELECOMMUNICATIONS SYSTEM

FIELD OF THE INVENTION

The present invention relates generally to telephone call centers and, more particularly, to a telephone communications system for a call center including computer workstations comprising a personal computer and a scalable telecommunication management apparatus (STMA) coupled to the computer and a phone line, the telephone communications system adapted to service a changing volume of outgoing or incoming calls by adding or deleting call stations as required.

BACKGROUND

After widespread adoption of telephones for residential use, marketers came to realize the advantages of using phones to contact potential customers as opposed to traditional methods of selling, i.e., door-to-door selling, direct mail advertising, etc., thereby initiating the age of telemarketing. Telemarketing is a form of direct marketing where a salesperson uses the telephone to call prospective customers in an attempt to sell products or services. Prospective customers are identified and qualified by various means, including past purchase histories, previous requests for information, credit limit, sweepstakes or competition entry forms or application forms. Names of prospective customers may also be purchased from another company's customer database, or obtained from a telephone directory or some other public list or forum. The qualification process is intended to find those prospective customers most likely to purchase the product or service being sold or advertised.

Call centers were established to engage in telemarketing activities. Call centers include necessary equipment and personnel to make telemarketing calls. Call centers may also serve as a customer service center to receive calls from existing or potential customers. For example, a call center could be used to receive telephone calls regarding purchase of a product or service from potential customers who are responding to a television, radio, newspaper/magazine and/or internet advertising campaign. A call center could also be used for customer service purposes to respond to product use and warranty questions, complaints, billing inquiries for existing customers, etc.

As the number of call centers grew, so did the need to be able to increase calling efficiency such that more calls could be placed per hour by a call center employee, thereby, increasing the number potential customers called in a shift. In effort to increase calling efficiency, a system referred to as a predictive dialer was developed. The predictive dialer is primarily used by large call centers having high volume telemarketing operations that contract their services to other companies. A predictive dialer system includes a server computer that is coupled to a large number (for example, 50-300) of workstation computers having two or three phone lines attached to each computer. The predictive dialer software attempts to predict how many calls need to be made for a phone to be answered and to predict when a telemarketer/operator on one of its workstations will be available to make a pick up an answered call. The prediction is accomplished by implementing a formula referred to as a "pacing algorithm." The server computer controlling the system constantly monitors the activities of the workstations and updates the calling "pace rate."

Because the predictive dialer operates by employing a statistical analysis, the larger the number of workstation computers, the better the predictive dialer works. In other words, with more workstation computers on the predictive dialer system, the shorter the pause between making a connection with called number (someone at the called number answering the phone) and a response by a telemarketer/operator to the picked up call. If the pause between the phone being answered and an operator responding to the answered phone is too long, either the person answering the phone will hang up after saying "hello" two or three times or the predictive dialer system, after a time out period, will hang up on the person answering the phone since no operator is available to pick up the answered call. Either situation is undesirable because a potential sale is missed and the person receiving the call is unnecessarily interrupted and irritated.

The latter situation, where a potential customer answering the phone is hung up on by the predictive dialer system is referred to as a "dropped call." Government regulations mandate that the number of dropped calls be a very small percent of calls answered. Thus, minimizing dropped calls is very important. However, as the number of workstations used in connection with predictive dialer system (for example, 10 or fewer), the average pause between phone answer by a potential customer and the response by a telemarketer/operator increases thereby increasing the number of dropped calls. Because of this dropped call problem associated with the predictive dialer, the predictive function can be disengaged. By disengaging the predictive function, the server does not start dialing the next phone number until one of its connected workstations disconnects, i.e., an operator is available. This defeats the purpose of the predictive dialer and reduces the number of contacts per hour on smaller telemarketing systems.

Therefore, there is a need for a cost-effective call center telecommunications system suitable for relatively low volume call centers utilizing low cost personal computers and off-the-shelf peripheral equipment. What is also needed is a telecommunications system for call centers that provides for seamless transition between telemarketing activities (outbound dialing of calls to potential customers) and customer service activities (receiving inbound calls from customers or potential customers). What is also needed is a telecommunications system for call centers that is upwardly or downwardly scalable, that is, the number of call center workstations or call stations can be increased as needed to accommodate increasing volumes of inbound or outbound calls without the need for expensive restructuring of the telecommunications system.

SUMMARY OF THE DISCLOSURE

The present invention is directed to a call center telecommunications system. In one preferred embodiment, the telecommunications system includes a call station or workstation comprising a host computer and a scalable telecommunication management apparatus (STMA) in communication with the computer providing for inbound and outbound calling activities. Preferably, the host computer is a low cost, off-the-shelf personal computer, available from a wide range of personal computer vendors. The host computer includes typical hardware and operating system software associated with personal computers and, advantageously, does not have to be a state-of-art system, rather, a lower-cost personal computer with a previous generation microprocessor will suffice. The STMA is preferably embodied in a circuit card plugged into an expansion slot of the host computer and interfaces with the host computer and a phone line.

The call center telecommunications system is scalable meaning that the number of call stations, each of which comprises a host computer and a STMA, may be easily increased or decreased depending on the volume of calls without the need for expensive restructuring of the telecommunications system.

Depending on desired call volumes, the telecommunications system may, in its simplest form, include a single call station or workstation comprising a single host computer, one STMA coupled to the host computer and one phone line coupled to the STMA. To increase capacity, a single host computer may include a plurality of STMAs coupled to the host computer, each STMA being coupled to a respective phone line.

Adding additional STMAs and phone lines to a single host computer call station ultimately reaches a point of diminishing returns because the operator manning the work station is only able to handle a finite number of inbound or outbound calls no matter how may telephone lines are available. If call center call volume requires, additional call stations may be added to the call center telecommunications system and the call stations may advantageously linked together to form a host computer cluster (HCC), that is, a cluster of workstations interconnected in a peer-to-peer network. In the HCC, each call station includes a host computer and one or more STMAs coupled to the host computer. The number of phone lines connected to the HCC determines the number of STMAs coupled to each host computer (one STMA for each phone line).

In the HCC, each of the plurality of host computers is coupled to each of the plurality of phone lines. Since the STMAs are typically plugged into expansion slots of a host computer and the number of expansion slots is limited, usually 4-6 per computer, an HCC is typically limited to 4-6 phone lines, 4-6 host computers and a total of 16-36 STMAs, where each host computer includes one STMA per phone line connected to the computer, i.e., if there are four phones lines coupled to a host computer, the host computer will have four STMAs. If call volume requires an even greater number of phone lines, the number of call stations may be increased by adding one or more additional HCCs to the telecommunications system.

In one aspect of the present invention, the STMA comprises a single, plug-and-play, device that serves as the interface between a plurality of diverse signals and functions including, a single telephone line, the host computer operating system and its peripherals, modulated signals, radio frequency receiver/transmitter, acoustic transducer, and other installed features of the present invention, including computer programs that control such activities.

In another aspect of the present invention, the STMA and host computer combine to provide a call station having multiple audio inputs and outputs to and from an acoustic transducer along with multiple visual outputs and tactile inputs that, in combination, provide a means whereby a full sensory, comprehensive and correcting training program can be implemented. Audio and visual support can be implemented where an operator of a host computer is informed of all the telephone activities of each line assigned to his or her host computer and/or HCC, along with information, if desired, from host computers in other HCCs. Supervisory support may be implemented in real time, and the multi-tasking needs of the operator of a call station can be fulfilled on an individual basis.

In yet another aspect of the present invention, inbound and outbound calling activities of a call station can be controlled and recorded, both digitally and acoustically. In an additional aspect of the present invention, the telecommunications system provides that all call stations and all HCCs in the system are controlled without the need for communication with a main server computer, telephone switchboard, or PBX system during its operation. The telecommunications system of the present invention does not require multiple phone lines, special phone lines, such as a data line, does not have, nor need, a pacing algorithm. Each call station of the present invention operates as a stand alone system. Therefore, there is no pause on the part of the call center operator when a called phone number is answered by a potential customer. The call center operator is ready to converse with the potential customer as soon as the potential customer answers the phone. This advantageously, substantially eliminates the dropped call problem.

Further, the telecommunication system of the present invention is not hardware dependent enabling the use of using low-cost, and even what may be considered obsolete, personal computers without impeding performance. The telecommunications system of the present invention fills a profoundly felt, yet unfulfilled, need for a cost efficient and use effective telecommunications system that can advantageously be used by smaller sized call centers and is adapted to be easily scaled up (adding call stations) or scaled down (eliminating call stations) as call volume dictates. The telecommunications system of the present invention also provides a viable solution for a larger sized call center that is seeking a solution to the dropped call and customer hang-up issue resulting from an unacceptably long pause when a potential customer answers his or her phone and no call center operator is on the line to communicate with the potential customer.

The above and other objects, effects, features and advantages of the present invention will become more apparent from the following description of the preferred embodiments thereof, taken in conjunction with the accompanying drawings.

DETAILED DESCRIPTION

Figure 1:
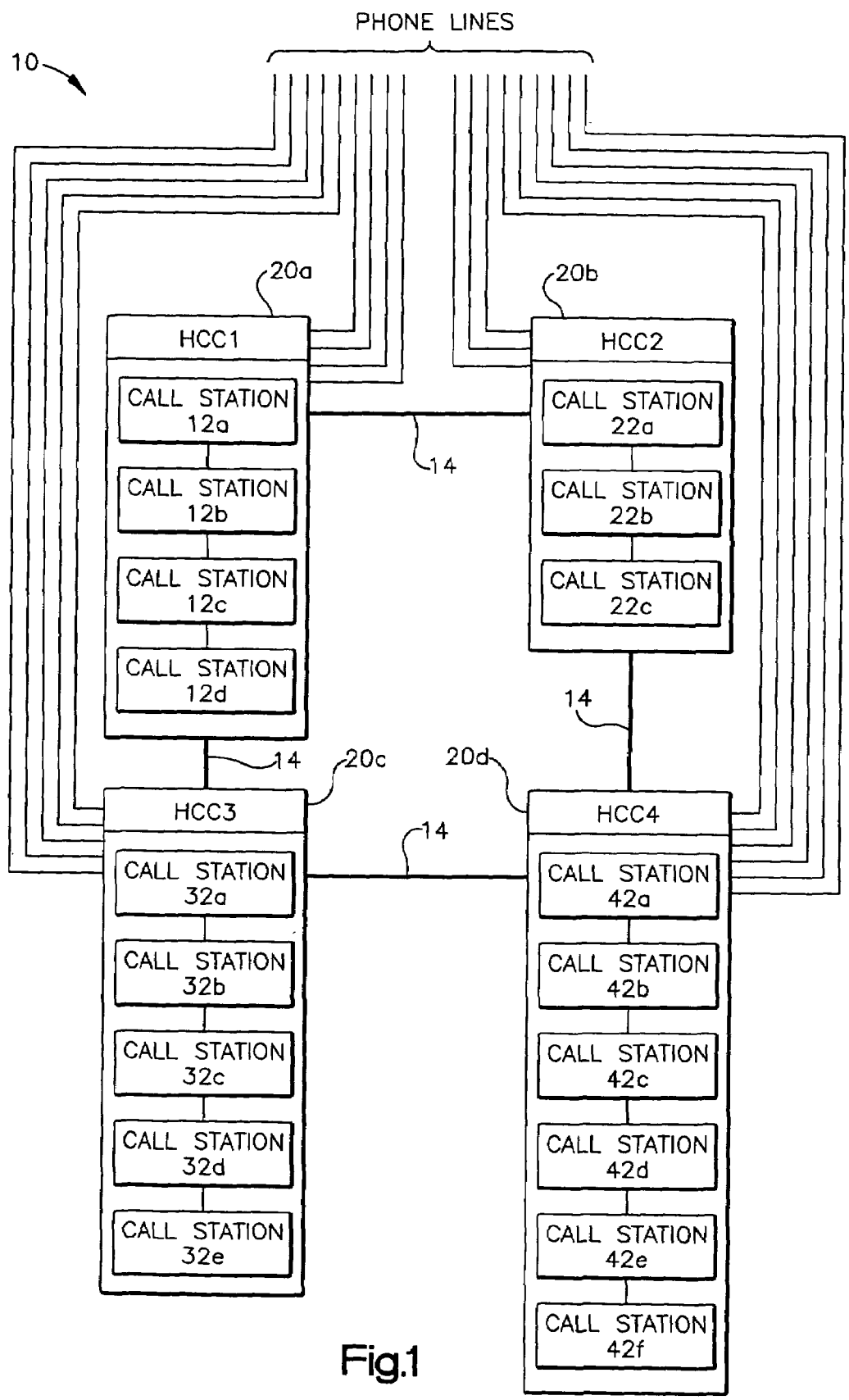
FIG. 1 is a schematic block diagram of a scalable call center telecommunications system of the present invention.

Turning now to the drawings, FIG. 1 depicts a telecommunications system for a call center, generally shown as reference character 10. The call center telecommunications system 10 includes four host computer clusters (HCC) 20a, 20b, 20c, 20d linked via a local area peer-to-peer network. Preferably, the network is hardwired via cat 5e cable 14 using Ethernet communications protocol, although one of skill in the art would recognize that the network may be structured using wireless communications. The system 10 is scalable meaning that the number of HCCs may be increased or decreased depending on call center calling volumes. Additionally, the number of host computers in each HCC may be increased or decreased depending, again on calling volumes. Since the HCCs are connected via a peer to peer daisy chain network, advantageously, no central server is required by the system 10.

The first HCC 20a is comprised of four call stations or workstations 12a, 12b, 12c, 12d, which are coupled to four phone lines 112, 120, 122, 124. The second HCC 20b is comprised of three call stations 22a, 22b, 22c which are coupled to three phone lines. The third HCC 20c is comprised of five call stations 32a, 32b, 32c, 32d, 32e which are coupled to five phone lines. Finally, the fourth HCC 20d is comprised of six call stations 42a, 42b, 42c, 42d, 42e, 42f which are coupled to six phone lines. The number of call stations in an HCC must at least be less than or equal to the number of phone lines coupled to the HCC.

The number of call stations in an HCC may be less than, equal to, or greater than the number of phone lines coupled to the HCC. Depending upon incoming and outgoing call volumes and the number of phone lines available, individual call stations may be added to or deleted from an HCC. For example, a HCC may comprise a single call station with one, two, or three or more telephone lines, two call stations, three call stations, etc. Similarly, HCCs (which are simply an interconnected group of call stations) may be added or dropped from the system 10 as needed without the need for restructuring the entire system 10. Stated another way, there may be one or more HCCs in the system 10 and each HCC may have one or more call stations.

Figure 2:
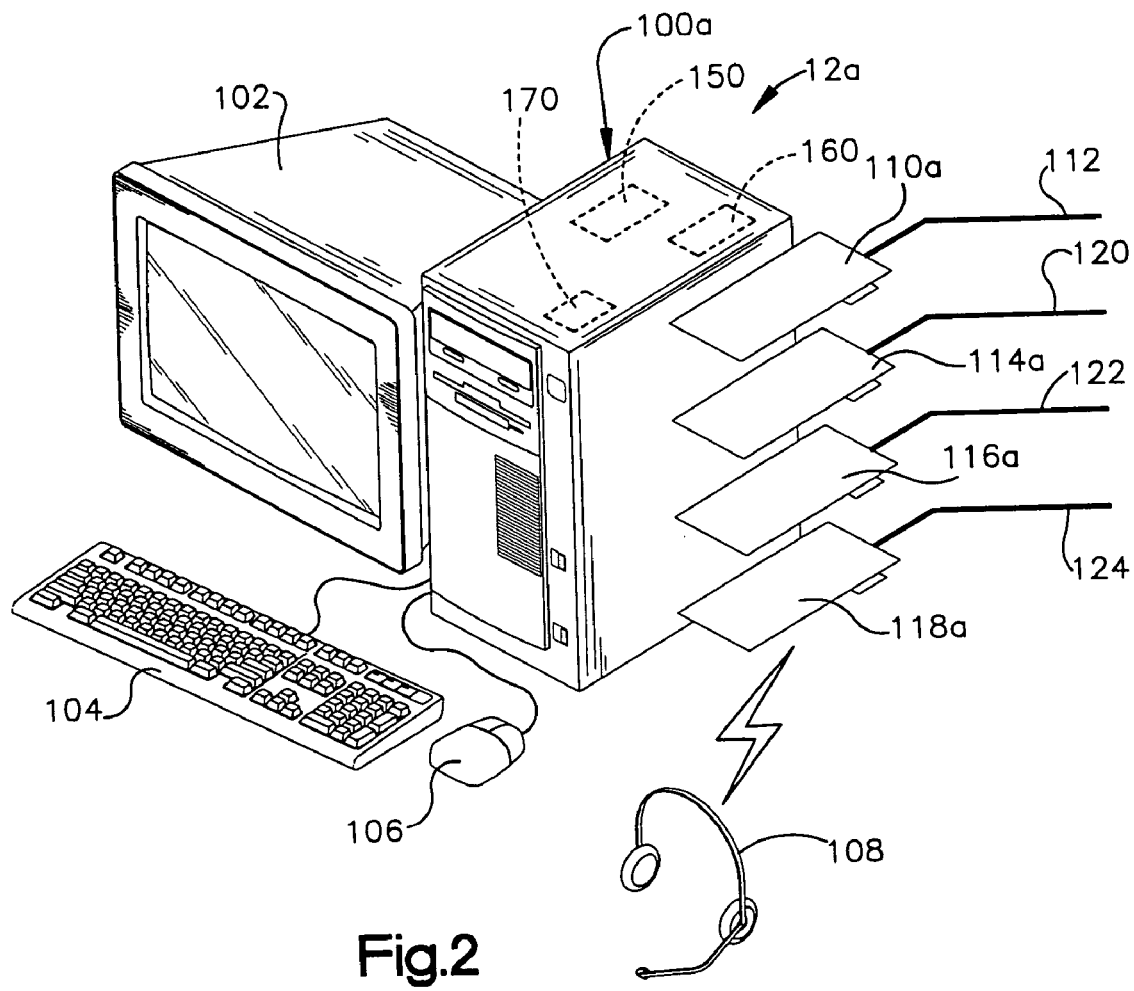
FIG. 2 is schematic depiction of a call station or workstation of the call center telecommunications system of FIG. 1.

FIG. 2 depicts a single call station 12a (i.e., one of the call stations 12a, 12b, 12c, 12d of HCC 20a). The call station 12a comprises a host computer 100a. Preferably, the host computer 100a is a personal computer having hardware and installed software (e.g., operating system software) that is typical for a personal computer use for business or home use. Advantageously, the computer 100a does not need to be a state-of-the-art personal computer having the most recent generation of microprocessor integrated circuit chip. Instead, a less expensive, personal computer (PC) with a slower microprocessor (e.g., PENTIUM II or PENTIUM III microprocessor) will suffice.

Associated with the host computer 100a are various peripheral devices used by the call center operator including a monitor 102, a keyboard 104, a mouse 106, and a headset 108 with radio frequency (RF) transmission microphone and headphone. Other devices associated with the host computer 100a include, but are not limited to, a CD and/or DVD player, a sound card, mass storage devices, bus interface connectors (schematically shown as 150 in FIG. 2) and a network interface card (NIC) (schematically shown as 160 in FIG. 2).

In addition to the host computer 100a, the call station 12a includes at least one scalable telecommunication management device or apparatus (STMA) attached to the bus interface connector 150 of the host computer 100a which enables the host computer 100a to communicate with its STMAs 110a, 114a, 116a, 118a and all of the host computer peripherals. The STMAs are preferably is embodied in circuit cards adapted to be inserted into empty expansion slots of the host computer 100a. The STMA 110a is coupled to the tip and ring lines of a telephone line 112, the STMA 114a is coupled to the tip and ring lines of a telephone line 120, the STMA 116a is coupled to the tip and ring lines of a telephone line 122, and the STMA 118a is coupled to the tip and ring lines of a telephone line 124.

An STMA is needed for each phone line coupled to the call station. For example, four phone lines are coupled to the HCC 20a, therefore, the call station 12a will have four STMAs 110a, 114a, 116a, 118a coupled to respective phone lines 112, 120, 122, 124. The number of STMAs for a given host computer 100a is dependent on the number of telephone lines linked to the host computer. It should be noted that an HCC may comprise a single, stand alone call station. The call station will include a host computer and one or more STMAs, the number of STMAs corresponding to the number of phone lines coupled to the host computer. It should be understood however that the operator of the call station can only handle a finite number of incoming or outgoing calls no matter how may STMAs and phone lines are provided. Thus, simply adding phone lines and STMAs to a single call station rapidly reaches a point of diminishing returns. Hence, typical HCCs will comprise multiple call stations, each with multiple STMAs coupled to multiple phone lines.

Figure 3:
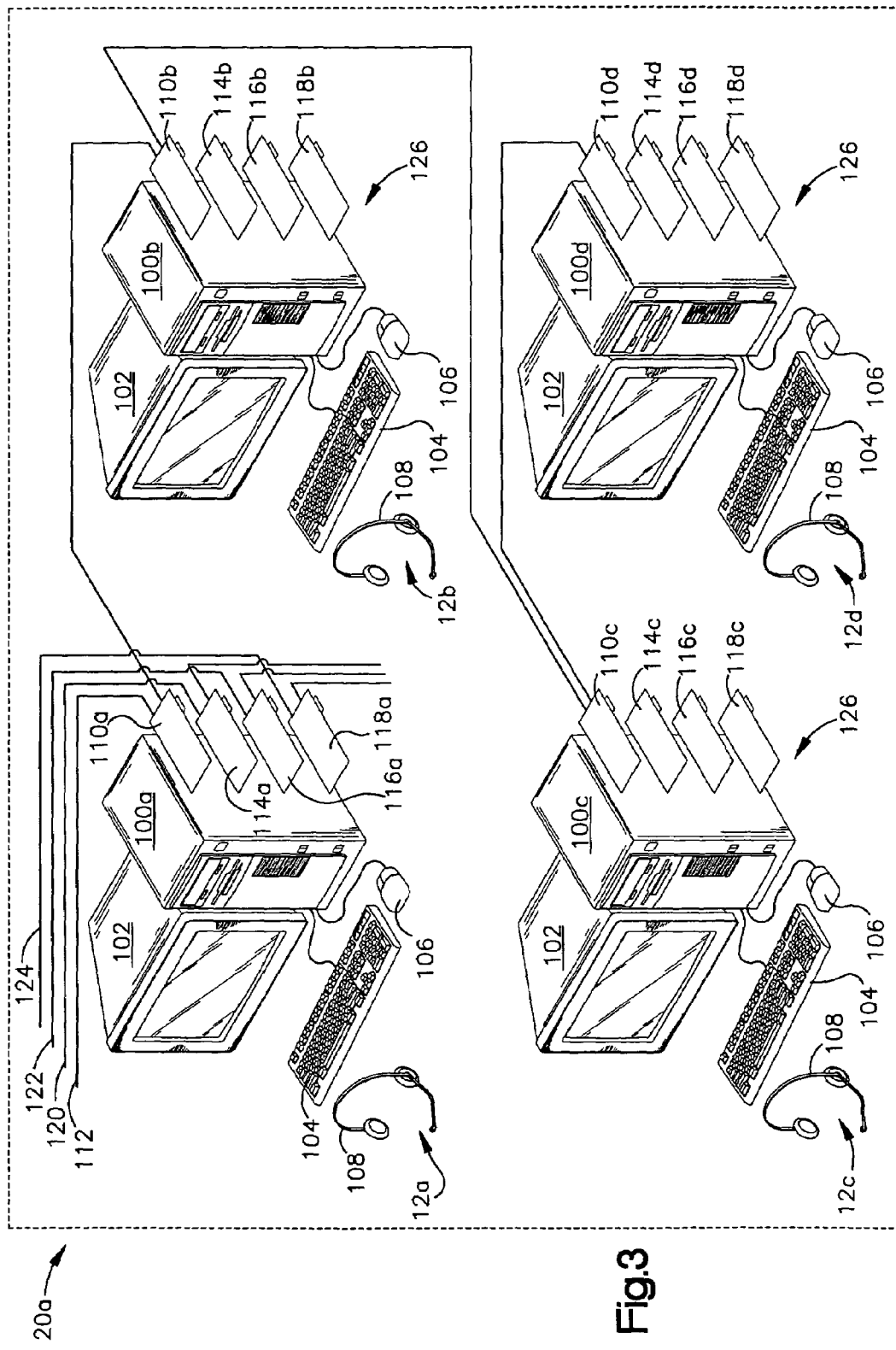
FIG. 3 is a schematic depiction of a host computer cluster (HCC) of the telecommunications system of FIG. 1.

FIG. 3 shows a schematic representation of an HCC or cluster 20a comprising four call stations 12a, 12b, 12c, 12e coupled to four phone lines 112, 120, 122, 124. Each call station 12a, 12b, 12c, 12d includes a respective host computer 100a, 100b, 100c, 100d. Each host computer includes any one or all of the peripherals as stated above, however, because there are four phone lines 112, 120, 122, 124 coupled to the HCC 20a, each host computer 100a-d must be coupled to four STMAs. For example, host computer 100a is coupled to STMAs 110a, 114a, 116a, 118a. The STMAs are designed to couple as many phone lines to a host computer as the host computer may facilitate by the number of bus connectors 150 available on the host computer.

As stated, each host computer 100a, 100b, 100c, 100d in the HCC cluster 20a has coupled to its respective bus connectors four STMAs 110a, 114a, 116a, 118a. The respective sets of STMAs of each host computer are coupled serially respective telephone lines 112, 120, 122, 124 associated with the cluster 20a. For example, telephone line 112 communicates with the first host computer 100a through the STMA 110a. The telephone line 112 then extends from the STMA 110a of host computer 100a to the STMA 110b of host computer 110b. The telephone line 112 further extends from the STMA 110b of host computer 100b to the STMA 110c of host computer 100c. Finally, the telephone line 112 extends from the STMA 110c of host computer 100c to the STMA 110d of host computer 100d. The same type of serial connection is repeated for each of the three additional telephone lines 120, 122, 124 through the additional STMAs 114a-d for telephone line 120, STMAs 116a-d for telephone line 122 and STMAs 118a-d for telephone line 124.

Each host computer 100a, 100b, 100c, 100d in the cluster 20a communicates with a digital network via the network interface card installed in each host computer (only one of which is shown schematically at 160 in FIG. 2 for host computer 100a). However, any number of HCCs may be connected to the network 10, thereby providing unlimited scalability. The headset 108, via RF communications, communicates with the primary STMA associated with its host computer through its acoustic transducer. For example, the primary STMA for host computer 100a is STMA 110a, while the secondary STMAs are 114a, 116a, 118a.

The phone lines 112, 120, 122, 124 include a roll over feature enabled. This allows-the STMAs to completely control the inbound and outbound calling functions of the phone lines 112, 120, 122, 124 coupled to them without the need a Public Branch Exchange (PBX), switchboard or another computer set up as a server for the system 10.

STMA Circuitry

Figure 4:
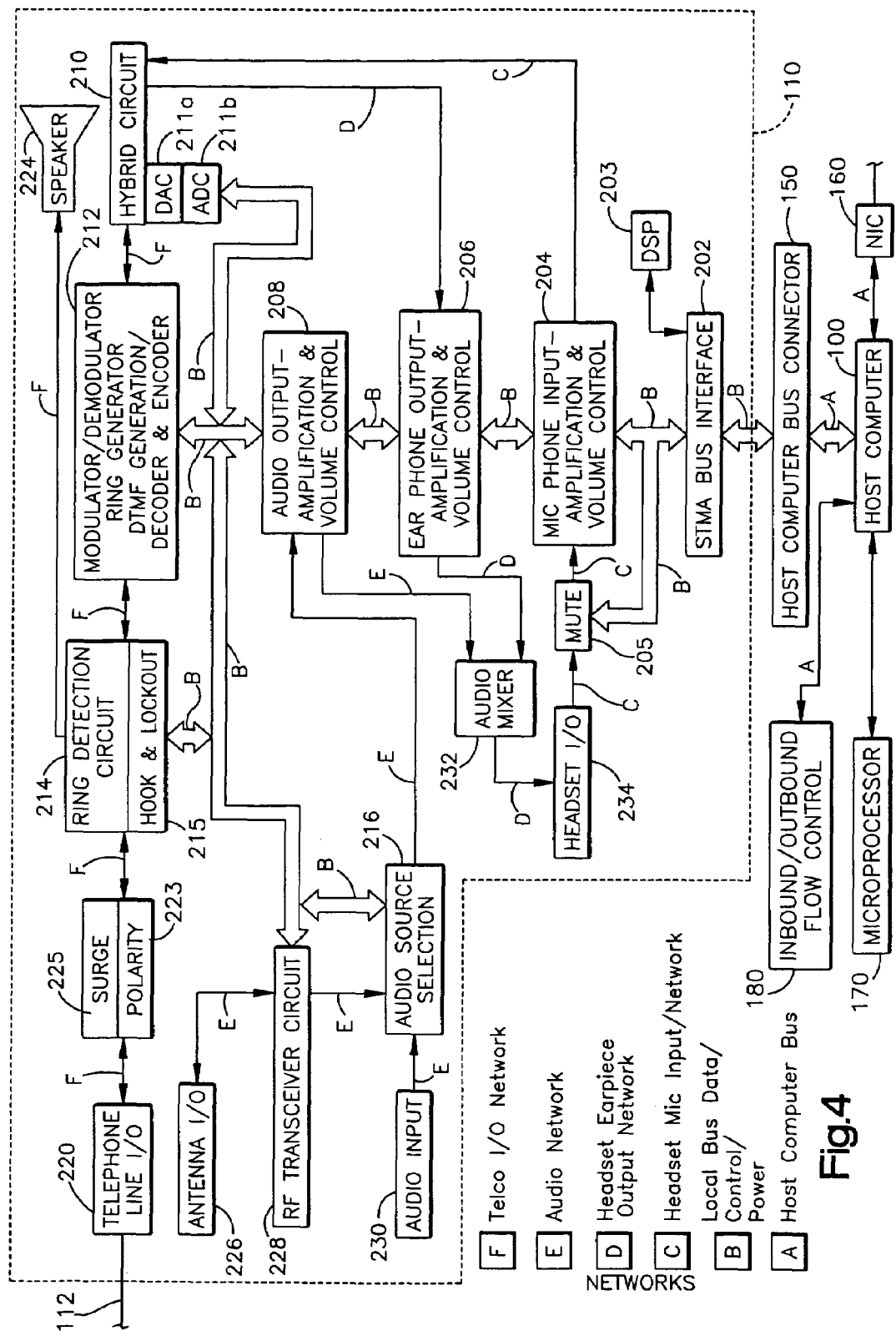
FIG. 4 is a schematic block depicting operation of a scalable telecommunication management apparatus (STMA) used in a call station of FIG. 2.

Referring now to FIG. 4, a block diagram is shown depicting the circuitry and networks connecting the circuitry of an STMA of the system 10. For a discussion of the operation of the STMAs, one specific STMA will be referred to by reference number 110, while one specific host computer will be referred to by reference number 100, it being understood that the following discussion of the STMA 110 and host computer 100 refers to all STMAs and host computers.

Figure 8:
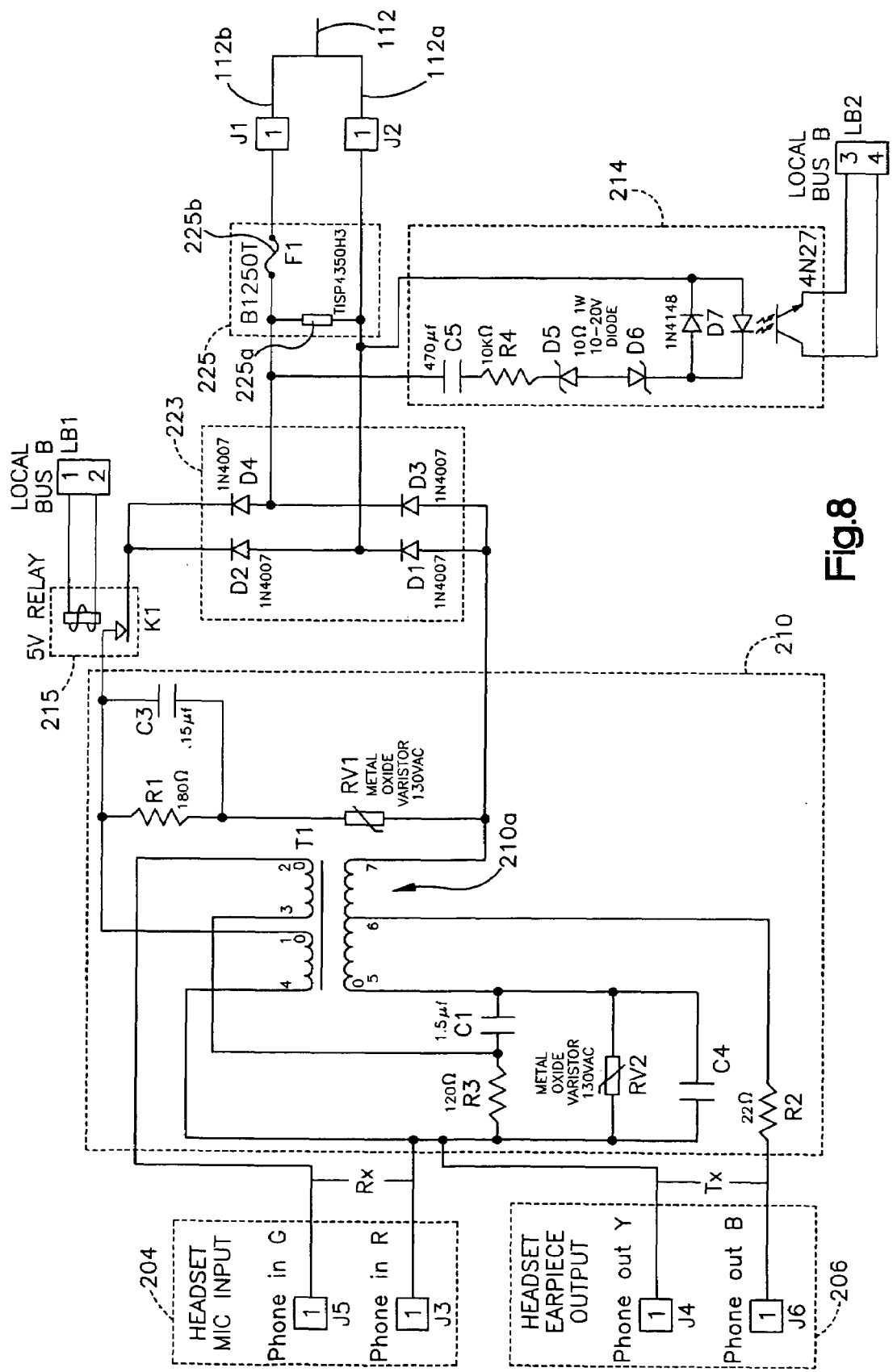
FIG. 8 is a circuit diagram of selected circuitry of an STMA circuit card.

It should be recognized that the STMA circuitry such as integrated circuit (IC) chips and hardwired circuits (some of which are shown in FIG. 8) described below may embodied in many different configurations including hardwired circuitry, digital integrated circuits, microprocessors such as PIC chips, microcontrollers, programmable controllers, application specific integrated circuits (ASIC) and field programmable gate arrays (FPGA), etc. While examples of suitable circuitry and IC chips are given below, it is the intent of the present invention to cover all the various possible embodiments of STMA electronics as would be understood by one of skill in the art that would accomplish the operation of the call station as described below.

It should also be apparent that STMA and/or host computer circuitry may be embodied in programming stored in memory on an IC chip or in a mass storage device associated with either the STMA or the host computer and executed by such microprocessors, controllers, FPGAs and the like. It is the intention of the present invention that "circuitry" as used herein be construed to include any combination of hardwired circuits, IC chips and/or programming executed by processors resident on either the STMA or the host computer.

Turning to FIG. 4, to permit communications between programs resident on the host computer 100 and programs and circuitry embodies on the STMA circuit card 110, a bus A of the host computer 100 is coupled to a local bus B of the STMA 110 via an PCI bus interface 202 which is coupled to a bus connector 150 of the host computer 100. There are many IC communications interface chip sets commercially available to allow the STMA bus interface 202 to receive, send and buffer a plurality of electronic signals, such as data, control signals, data signal processing signals, etc. to and from the host computer's bus A to the bus B of the STMA 110. One suitable STMA bus interface chip set is product no. QL5030 QuickPCI 32 bit bus interface chip set sold by QuickLogic Corp., Sunnyvale, Calif. (www.quicklogic.com). The STMA bus interface chip is affixed to the STMA circuit card 110. Coupled to the STMA bus interface 202 is a digital signal processor (DSP) chip 203 which maintains the integrity of signals passed through the STMA bus interface 202. A suitable DSP chip is product no. TMS320C62× sold by Texas Instruments, Houston, Tex. A phone line 112, having tip and ring lines 112a, 112b, is coupled to the STMA via an RJ11 jack connector 220.

A plurality of computer programs residing on the host computer 100, working through its microprocessor 170, controls all the functions of the STMA 110 through the STMA bus interface 202 and its associated circuitry. In addition to the STMA local bus B, the circuitry of the STMA 110 includes a number of other networks including a headset microphone input network, identified as C in FIG. 4, a headset earpiece output network, identified as D in FIG. 4, an audio network, identified as E in FIG. 4, and a telephone company input/out network, identified as F in FIG. 4.

A microphone (mic/phone) input amplification control circuit 204 of the STMA 110 communicates to the STMA bus interface 202 through the local bus data/control/power network B. The STMA 110 further includes an interrupt mute control circuit 205 between the headset input/output circuit 234 and the volume control 208. A suitable microphone input amplification control circuit 204 is product no. DS1169 digital potentiometer sold by Dallas Semiconductor/Maxim Integrated Products, Sunnyvale, Calif. (www.maxim-ic.com). Ear phone output circuit 206 and an audio output amplification control circuit 208 likewise communicate with the STMA bus interface 202 via the local bus network B. There are many commercially available single integrated circuit (IC) chips such as audio operational amplifiers and digitally controlled potentiometers that provide amplification and volume control which can be supported by the STMA 110. A suitable audio output amplification control circuit 208 is product no. CS3310-KOP stereo digital volume control chip set sold by Cirrus Logic, Inc. of Austin, Tex. (www.cirrus.com).

The local bus network B likewise communicates with a hybrid circuit 210, a modulator/demodulator, ring generator, DTMF generator, and decoder & encoder circuit 212, a ring detection circuit 214, a hook and lock out circuit 215, an RF transceiver circuit 228 and an audio source selector 216.

The modulator/demodulator, ring generator, DTMF generator and decoder & encoder circuit 212 replaces and eliminates the need for a modem to communicate with the phone line 112. The circuit 212 performs the following basic functions: 1) modulator/demodulator—modulates or converts from and to frequency-based audio tone signals representing data sent over the phone line serially (e.g., caller ID data) to parallel 8 or 16 bit digital signals that are used by the call station digital electronics; 2) ring generator—when a ring signal is detected on the phone line, the ring generator generates a ring signal that causes the piezo speaker 224 on the STMA board 110 to ring; 3) DTMF—dual tone multiple frequency circuit—converts from and to a digital signal identifying two frequency values generated by an encoder to a dual frequency audio tone signal that is transmitted on the phone line; and 4) decoder & encoder—modulates or converts from or to a digital signal identifying two frequency values to a digital signal representing a numerical/symbol value corresponding to the 12 numbers and symbols (1, 2, 3, 4, 5, 6, 7, 8, 9, *, 0, #) on a phone keypad. Suitable circuitry for the modulator/demodulator, ring generator, DTMF generator, and decoder & encoder circuit 212 is product no. APL43 modem chipset sold by Agere Systems, Arlington, Pa.

FIG. 8 includes a circuit diagram of selected STMA circuitry including the hybrid circuit 210. The hybrid circuit 210 receives voice analog input signals from the microphone (mic/phone) input amplification control circuit 204 and outputs voice analog signals to the ear phone output circuit 206. Essentially, the tip and ring lines 112a, 112b of the telephone line 112 have a DC signal riding on top of an AC signal. The hybrid circuit separates the two line DC and AC signals via a transformer which blocks the DC signal but transmits the AC signal into a four line signal (two Tx lines and two Rx lines). The transformer 210a of the hybrid circuit 210 preferably is a model no. RL-7716 single hybrid transformer sold by Renco Electronics, Inc. Rockledge, Fla. (www.rencousa.com).

Coupled between the hybrid circuit 210 and the local bus B are an analog to digital converter (ADC) 211a and a digital to analog converter (DAC) 211b for appropriately converting, as necessary, digital signals to analog and analog signals to digital depending on what circuitry will be utilizing the signals. A suitable ADC is product no. TLC548CD sold by Texas Instruments of Houston, Tex. (www.ti.com) and a suitable DAC is product no MAX5539 sold by Maxim IC of Sunnyvale, Calif.

The telephone input/output network (telco I/O network) F includes a telephone line I/O 220, such as the RJ11 jack connector described above, which allows the tip and ring lines of the phone line 112 to be coupled to the STMA board 110. The hook and lock out circuit 215, coupled to the telco I/O network F, controls whether the signal from the telephone line 112 is sent along the telco I/O network F or is locked out and passed along to another host computer in the HCC. Shown schematically in FIG. 8, the hook and lock out circuit 215 is coupled between the tip 112a and ring lines 112b of the telephone line 112. The circuit 215 is essentially a relay that breaks one or both of the ring or tip lines 112a, 112b to disconnect a call. With the hook and lock out circuit 215, the STMA 110 can be programmatically locked out from detecting and reacting to a signal from the telephone line 112.

A surge circuit 225 (shown in FIG. 8) provides high voltage and surge protection to the STMA electronics in the event there is a high voltage transient imposed on the phone line 112, e.g., lightening strikes the phone line. The surge circuit 225 includes a thyristor 225a, preferably product no. TISP4350H3 and an in-line telephone fuse 225b, preferably product no. B1250T, both sold by Bourns, Inc., Riverside, Calif. (www.bourns.com). A polarity circuit 223 (shown in FIG. 8) compensates for reverse tip and ring signals (reverse polarity) in the event the telephone line tip and ring lines 112a, 112b are reversed.

Coupled to the telco I/O network F is the ring detection circuit 214 which detects ring signals on the phone line 112. The ring detection circuit 214 works by detecting an overvoltage condition on phone line 112 indicative of a phone ring. In response to a phone ring, the ring detection circuit 214 puts a signal on local bus B indicating an incoming phone call. A suitable ring detection circuit 214 is shown in FIG. 8.

The RF transceiver circuit 228 receives and transmits radio frequency voice signals to and from the headset 108 via an antenna I/O 230 also mounted on the STMA card 110. Alternately, the headset 108 may be hardwired to the local bus B via headset I/O 234. A suitable RF transceiver circuit is product no. TDA1315H digital audio input/output circuit sold by Philips Semiconductors NV, Eindhoven, Netherlands (www.semiconductors.philips.com).

When a ring signal is detected by the ring detection circuit 214, the data of such detection is passed along the telco I/O network F to the modulator/demodulator, DTMF generator and decoder & encoder circuit 212. The circuit 212, in turn, passes the ring signal on to the STMA local bus B. The ring generator 212 may be a monolithic IC such as product no. TMC1506B sold by Texas Instruments, which converts the signal from the telephone line into an audio signal and sends it to both the onboard speaker 224 via the telco I/O network F and the speaker in the headset audio transducer 234 via the audio network E and headset/microphone network C. The board speaker 224 communicates through the ring detection and hook & lock out circuits 214, 215 on the telco I/O network F. The DTMF generator/decoder & encoder 212 modulates and demodulates signals for transmitting and receiving data over conventional telephone lines. The circuit 212 also generates a dial tone multi-frequency (DTMF) signal for transmitting to the telephone line. The DTMF generation decoder, outputs a digital signal of a value corresponding to an inputted tone signal (a signal in audio frequency band). The DTMF generation encoder, outputs a tone signal of a value corresponding to an inputted digital signal.

The DTMF generator/decoder & encoder 212 communicates with the hybrid circuit 210 along the telco I/O network F. The hybrid circuit 210 separates the telephone line signal into a four line signal consisting of a two line transmit (Tx) and a two line receive (Rx). The telephone line 112, as mentioned above, consists of two lines, tip and ring 112a, 112b, that carry both transmit (Tx) and receive (Rx) signals on each line 112a, 112b.

The audio output/amplification and volume control 208 send signals to various audio components of the STMA 110 through the audio network E. The antenna I/O 226 allows for an appropriate antenna signal to be coupled to the STMA. The antenna 226 communicates with the RF transceiver circuit 228 that receives and transmits radio frequencies. Such capacities include intermediate frequency (IF) amplification, duplexing, digitally controlled tuning, demodulation, programmable gain amplification, analog-to-digital conversion (ADC), digital-to-analog conversion (DAC), digital down conversion (DDC), digital signal processing (DSP), and direct digital synthesis (DDS). The mentioned capacities may be facilitated by various integrated circuits (IC) chips which are commercially available.

The RF transceiver circuit 228 further communicates with an audio source selector 216. The audio source selector 216 is a series of electronic relays that allows for the selection between many different audio input signals via the audio input 230. The audio input 230 couples the host computer's peripherals, such as a CD or DVD player, to the STMA 110.

The audio source selector 216 communicates via the audio network E to the audio output amplification and volume control 208. The audio output amplification and volume control 208 outputs a signal to the audio mixer 232 along the audio network E. The audio mixer 232 maintains the audio output, in terms of decibels, of the speakers of the headset acoustic transducer 234 within a determined range. This is required due to the fact that the signals from the audio output 208 can come from a variety of sources. The signal must be mixed with the ear phone output 206 signal in such a way to control acoustic distortion and so that one signal does not override the other.

A signal from the hybrid circuit 210 is sent to the ear phone output-amplification & volume control 206 via the headset earpiece output network D. This signal is further sent along the headset earpiece network D through the audio mixer 232 and finally to the headset I/O 234. An input signal through the microphone on the headset 234 is carried to the hybrid circuit 210 along the headset microphone input network C. The headset microphone input network C includes an intermediate mute circuit 205 and the microphone phone input-amplification & volume control 204 along its path.

The circuitry of the STMA 110, as described above, includes many devices which are coupled to the local bus B of the STMA through the DSP 203. The DSP 203 is coupled to the bus interface 202 which in turn connects to the host computer through the bus connector 150. The host computer 100 includes a number of computer programs which manage inbound and outbound calls from the telephone lines 112, 120, 122, 124. A database for scheduling and recording inbound and outbound activities may, likewise, be managed. Caller ID information may be obtained and displayed to the operator of a call center 12, DTMF signal pulses may be transmitted to the telephone line to dial phone numbers or send signal information. Data and facsimile information may be sent or received. DTMF signals may be received for telephony operation. Further, a supervisor wearing an RF receiver headset 108, by walking in the proximity of a call center can tune in and listen to conversations between the call center operator and the potential customers being called. Still further, an operator of a call station can tune in his or her favorite radio station, listen to his or her own CDs or view a DVD while he or she works.

Processing Inbound Calls

Figure 5:
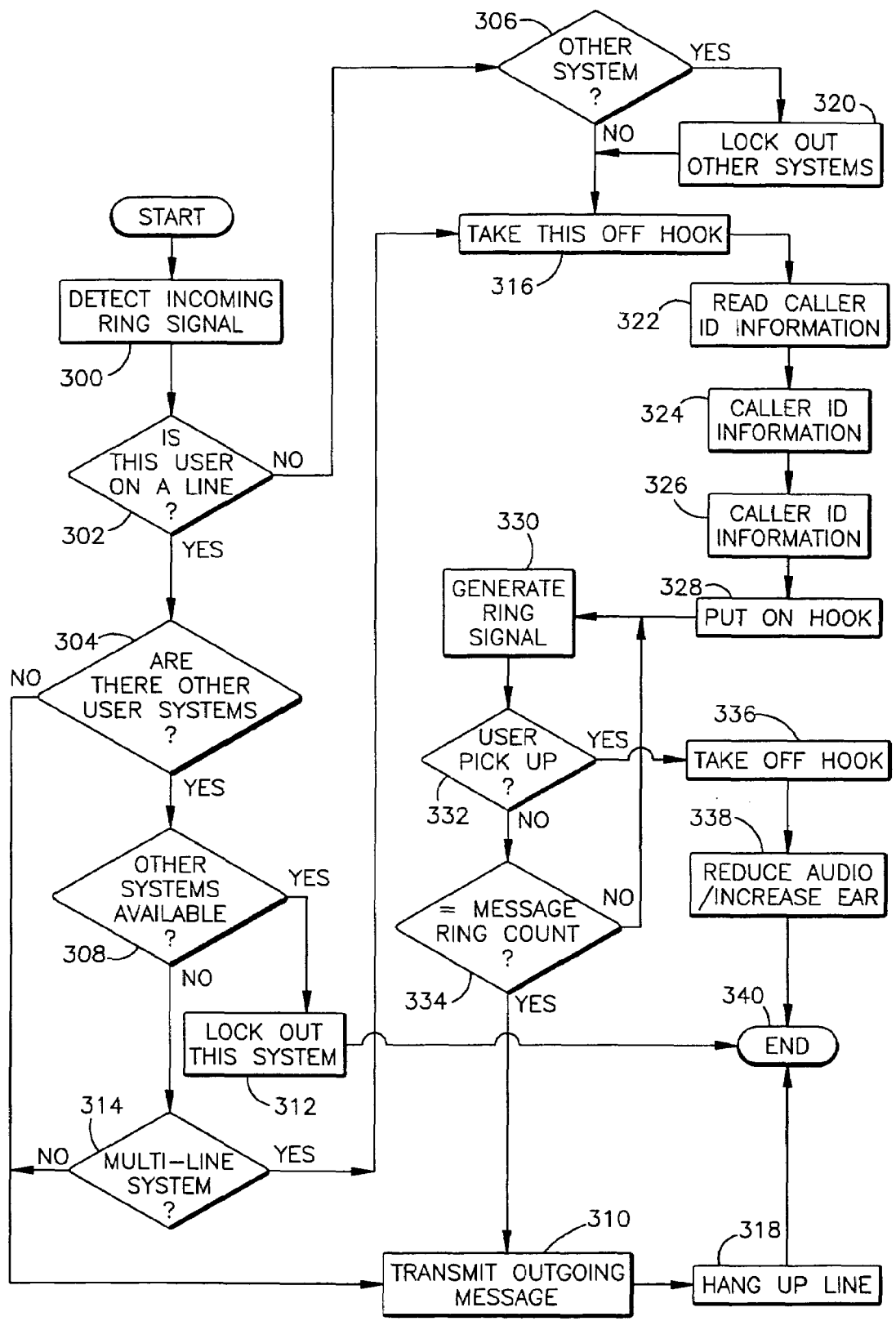
FIG. 5 is a flow chart of computer programming used in processing incoming calls to the call center telecommunications system of FIG. 1.

FIG. 5 depicts generally at 300 a flow chart of programming to handle incoming phone calls to the call center. The programming is imbedded partially in the PCI STMA bus interface 202 and partially in memory on the host computer 100. Referring to FIG. 5, during operation, as is shown at step 301, when the ring detection circuit 214 detects a ring signal from the telephone line I/O 220, a signal is sent via the local bus B to the bus interface 202. The programs in the bus interface 202 write to its random access memory (RAM) at a specific location indicating a first occurrence of the ring signal has occurred, which line is ringing, which STMA is receiving the ring signal and generates an interrupt. Part of the program, running on the host computer 100 is alerted. The program then communicates through the bus interface connection a section of RAM on the STMA 110 to determine a plurality of conditions, such as, which phone line 112, 120, 122, 124 is ringing and which STMA 110, 114, 116, 118 is receiving the ring signal.

The program then writes the inputted data to a section of the host computer's RAM allocated for this and other pertinent information such as, how many STMAs reside on the host computer and what telephone line are allocated or assigned to each STMA of the host computer. The program will also determine if there are other host computers 100 connected to the computer and determine the number of STMAs such computer has which is equal to the number of computers on the HCC. In addition, the program will determine the status of each STMA across the HCC. The program is now ready to proceed to the next step.

In the second step 302, the program ascertains, by reading the host computer's 100 RAM whether this call station operator is already on a call. If so, program execution continues to step 304. On the other hand if this operator is not already on a call, control advances to step 306. In step 304, the program ascertains whether there are other host computers with STMAs connected to the host computer cluster 20. If so, program execution continues to step 308. On the other hand, if this is not the case, control advances to step 310.

In step 308, the program ascertains whether there are other call station operators currently available in the HCC 20 to receive a call. If so, program execution advances to step 312. On the other hand if this is not the case, control continues to step 314. In step 314, the program ascertains whether the host computer 100 has multiple telephone lines and therefore multiple STMAs. If the computer includes multiple STMAs, program execution advances to step 316. Whereas, if this is not the case, control continues to step 310. In step 310, the program has determined by the tests of steps 302, 304, 308, 314 that a user will not be able to receive this call in a prescribed manner. The program then reads a previously recorded digital message from a memory location on the host computer and sends it to the STMA where it converts the message to an appropriate audio signal, amplifies the signal, and after taking the line off hook using the hook circuit 214, transmits it through the hybrid circuit 210 out the telco I/O network F, to the telephone line I/O 220. It is obvious to one skilled in the art that, at this point, a sub-routine of the program, not illustrated, could be called to allow the caller to receive a message giving them options, such as whether they would like to leave a message, continue to hold, etc., thereby enabling the caller to use telephony to select an option of their choice. The sub-routine would act appropriately to the caller's choices then return control to the calling program.

In step 318, the program will record in a memory location on the host computer 100 all required information pertaining to a call, such as, time of call, caller ID information, messages sent, and/or any telephony options invoked. The program will then update the information on the display screens of all the users in this HCC 20a through a graphic user interface (GUI) 500 explained below. All host computers in the HCC 20a, upon receiving this information will de-activate the lock out function of the hook and lock out circuits 215 on the STMAs present on the host computer 100, thereby readying all systems to receive another call on that particular line. Finally, in step 318, the program will force the telephone line to go on hook, using the hook circuit 215, and the program will then terminate.

On the other hand, if the test of step 302 determines the operator of the call center is available to take this call, control is passed to step 306. In step 306, the program determines if there are other host computers associated with this particular telephone line. If so, control goes to step 320. In step 320, the program sends a signal, through the network interface card (NIC) 160 to the other systems associated with this telephone line to activate the lock out function of the hook and lock out circuit 215 of the STMAs, thereby avoiding other systems interference with this particular host computer's activities. In step 316, the program upon receiving a signal that the first ring signal has ended, will take the telephone line off hook, using the hook circuit 214, and open the telco I/O network F, to the modulator demodulator (modem) 212. In step 322, the modem 212 will demodulate and translate the caller ID information, passing this information to the program via the local bus B.

In step 324, the program will display received caller ID information on the host computers monitor 102. In step 326, the program will record the caller ID information, along with other pertinent information, to a prescribed mass storage device on the host computer 100. In step 328, the program will place the telephone line back into the on hook state using the hook circuit 214 on that particular STMA that is receiving the call. In step 330, the program will then instruct STMA to generate an audio ring signal using the ring generator 212, passing this signal to the speaker 224 on the STMA and the speakers of the acoustic transducer 234. In step 332, the program will determine if the user has answered the call. If the user does not answer the call, the control is passed to step 334. However, if the user has answered the call the control is advanced to step 336.

In step 334, the program monitors the ring counter and determines if a predetermined number of rings has been reached, for example, four or five rings. If the call is not answered within the predetermined number of rings, the control is passed back to step 330 to generate another audio ring signal. In the event this sequence happens, control is passed to step 310, which transmits an outgoing message to the phone line. On the other hand, if the test of step 332 determines the user answers the call then in step 336, the program will take the telephone line off hook, using the hook circuit 214, and open the telco I/O network F, to the hybrid circuit 210, allowing the user to communicate with the caller through the users acoustic transducer 234, passing the bidirectional signals along the telco I/O network F, the headset earpiece output Network D, and the headset mic input network C.

Finally, in step 338, the program directs the STMA to reduce the signal volume along the audio network E to a background level using the audio output—amplification & volume control circuit 208, while at the same time directing the STMA to increase the signal volume along the headset earpiece output network D to a predetermined level using the ear phone output—amplification & volume control circuit 206. The program will then test to ensure that the mute circuit 205 in not engaged and the mic phone input—amplification & volume control 204 is set to a predetermined level. At this point the program will terminate at the end sequence 340.

It is obvious to one skilled in the art in view of the foregoing that during the processing of a call, information will be acquired and recorded and all the appropriate signals and settings for the STMA will be maintained by another program. Additionally, if the user is watching a DVD, the secondary program should instruct that primary calling program to pause the DVD in order to answer an incoming call.

In some instances, either by the user selecting as an option or by a program that resides on the host computer, a determination can be made that the flow of inbound calls, say from an advertisement campaign, has slowed sufficiently that a call station or stations may be released from a purely inbound operation and assigned to do outbound calling.

Processing Outbound Calls

Figure 6:
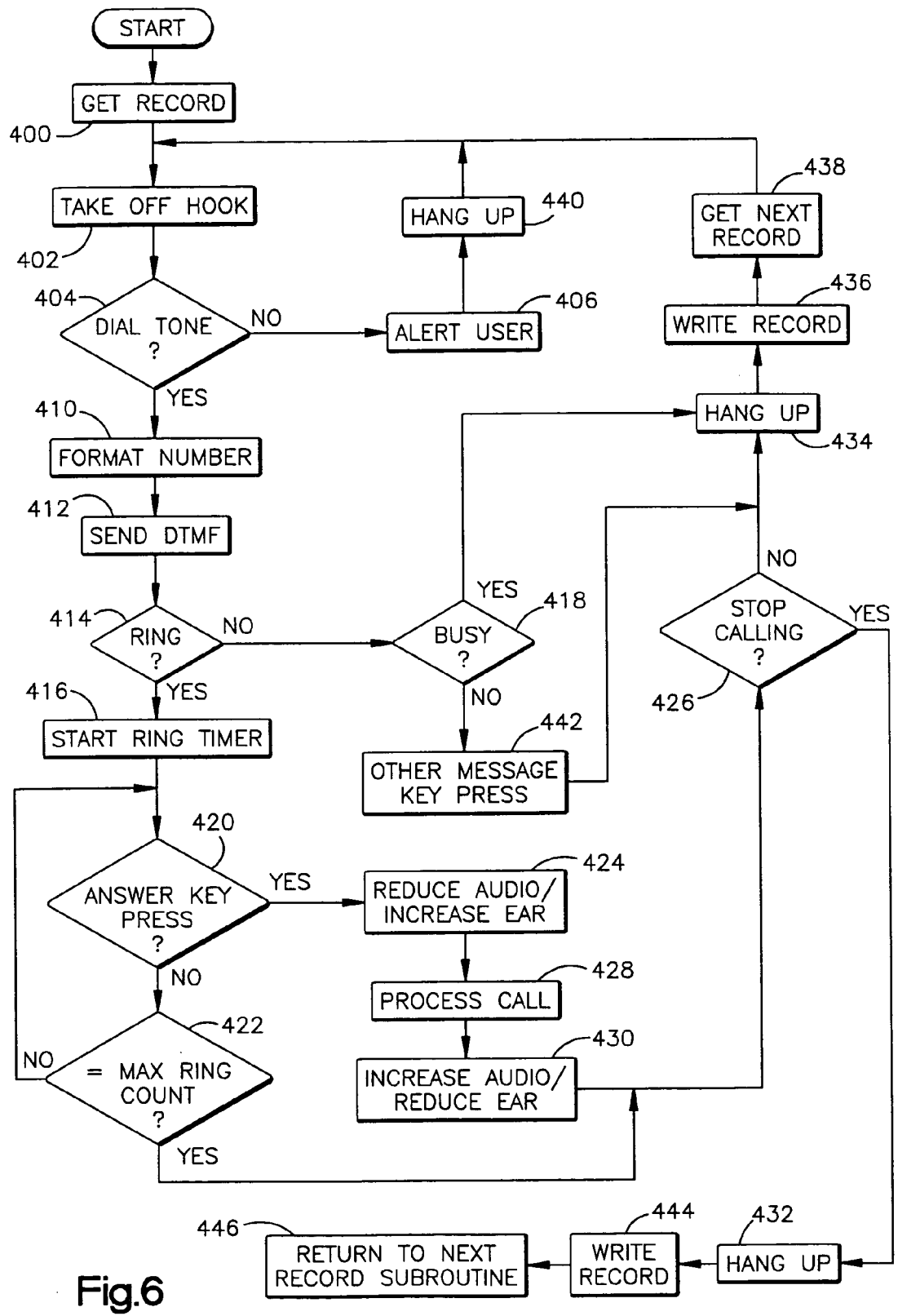
FIG. 6 is a flow chart of computer programming used in processing outgoing calls from the call center telecommunications systems of FIG. 1.

An outbound calling program, embodied in the circuitry or software on the STMA circuit card 110 and the host computer 100, is shown as a flow chart generally at 400 in FIG. 6. Referring to FIG. 6, at step 401, the program retrieves a record from a memory location residing at a predetermined location on the host computer's mass storage device, e.g., hard drive. In step 402, the program instructs the STMA to take the phone line off hook using the hook circuit 214. Further, the program determines if there are other host computers with an STMA associated with the particular incoming telephone line, if so, it instructs those host computers, through its NIC, to activate their lock out function of the hook and lock out circuit 215 on their STMA for that particular telephone line. Next, in step 404, the program waits for a prescribed duration to receive a dial tone signal from the STMA that is provided by the DTMF generator circuit 212. If no signal is received, the control advances to step 406. If a signal is received, control continues to step 410.

In step 410, the program reads the telephone number obtained from the record of step 400 that has been retrieved. The program then breaks this telephone number into three components, the area code, the first three numbers of the telephone number, herein called the prefix, and the last four digits of the telephone number, herein called the number. The program then compares these component numbers against a plurality of tables that are stored in a memory location of the host computer. Based on this comparison, the program formats the number as required by adding or removing digits from the telephone number such as, adding a "1" to the beginning of the number should the program determine the area code and prefix represents a long distance number, or a "9", for example, to obtain an outside line, or removing the area code, should it be deemed not required for this telephone number.

In step 412, the program sends this said formatted number, a digit at a time, at a prescribed pace, to the STMA via the host computer bus A. The DTMF Generator 212 converts those digits to the proper multi frequency tones and sends that signal along the telco I/O network F to the telephone line I/O 220. In step 414, the program waits a prescribed duration to receive an outbound ring signal which is provided by the modulator demodulator and DTMF decoder circuit 212. Additionally, the telco I/O network F is taken off hook using the hook circuit 214 to the hybrid circuit 210 which transmit any signal information along the headset earpiece output network D to the speakers of the acoustic transducer 234 giving the user audio information to further dispose of the call. If the program determines that the called number is ringing, hence a connection has been made, control is passed to step 416. Where no connection is made, control is advanced to step 418.

In step 416, the program, upon receiving an outbound ring signal starts a timer to count rings and terminate the call upon the completion of a predetermined number of rings. This feature is useful to, among other things, assure that the system is operating within prescribed local and federal laws, which limit how long a telemarketer may ring a phone of a potential customer. In step 420, the program tests for keyboard input from the host computer indicating that the called party has answered the call. It is obvious, to one skilled in the art that other means could be used, such as sensing impedance, to give the program the necessary input for this test. If the program determines that the called party has not answered the call, control is passed to step 422. Otherwise, control is advanced to step 424.

In step 422, the program checks if the predetermined maximum rings has been satisfied. If not, control is passed back to step 420. Otherwise, control is advanced to step 426. On the other hand, if the test of step 420 determines the called party has answered the call, the program will then direct the STMA to reduce the signal volume along the audio network E to a background level using the audio output—amplification & volume control circuit 208, while at the same time the program will direct the STMA to increase the signal volume along the headset earpiece output network D to a predetermined level using the ear phone output—amplification & volume control circuit 206. The program will then test to ensure that the mute circuit 205 in not engaged and that the mic phone input—amplification & volume control 204 is set to a predetermined level. It is obvious to one skilled in the art that if the user is watching a DVD, the program should instruct that program to pause the DVD at the point where in incoming or outgoing call is in progress.

In step 428, the program will allow the user, through inputs from the host computer's keyboard and mouse, to process the call. During processing, the program will collect and record various required information. Such information may include but not limited to personal information of the called party, playing audio information, taking text and audio messages, transferring a call, adding the called party to a do-not-call list, and sending or receiving data information via fax. The user will then inform the program, through inputs from the host computer's keyboard and/or mouse, that the session has ended the call with the called party.

In step 430, the program will direct the STMA to increase the signal volume along the audio network E to a level the user set prior to taking a call, using the audio output—amplification & volume control circuit 208, while at the same time direct the STMA to reduce the signal volume along the headset earpiece output network D to a predetermined level using the ear phone output—amplification & volume control circuit 206. The program then tests to ensure that the mute circuit 205 in not engaged and the mic phone input—amplification & volume control 204 is set to the predetermined level.

In step 426, the program tests to determine if outbound calling activities should be ended. This is predicated by any number of conditions, such as for example, the end of the user's shift, lunch or break time, the volume of inbound calls has increased and the system ends its outbound calling activities to make itself available for incoming calls, or the user has to leave this station and is not available. If outbound calling activities should be ended, control is advanced to step 432. Otherwise, control is passed the step 434. In step 434, the program will record in a memory location on the host computer all required information pertaining to the call, such as, time of call, caller ID information, message sent, any telephony options invoked. The program will then update the information on the display screens of all the users in the HCC 20*a* through the graphic user interface (GUI) 500, explained below. All host computers, upon receiving this information will de-activate their lock out circuits of the hook and lock out circuit 215, thereby readying the systems to use this particular telephone line. Finally, the program will force the telephone line to go on hook, using the hook and lock out circuit 215.

In step 436, the program writes all the pertinent information collected during processing of a call to a memory location residing at a predetermined location on the host computer's mass storage device. In step 438, the program retrieves the next sequential record from a memory location residing at a predetermined location on the host computer's mass storage device. Control is then passed back to step 402 to place the next call. If the test in step 404 indicates that no dial tone was detected then in step 406, the program will display that information on the host computer's monitor 102 to notify the user of such. In step 440, the program will force the telephone line to go on hook, using the hook and lock out circuit 215. The program will then pass control back to step 402 to make another attempt at obtaining a dial tone. It is obvious to one skilled in the art that after a predetermined number of attempts, an error message should be displayed so corrective measures may be taken.

If the test in step 414 indicates that something other than a ring signal has been received then in step 418, the program will determine if it has received an indication from the modulator demodulator and the DTMF decoder circuit 212 that a busy signal has been received. If so, control is passed back to step 434. Otherwise, control is passed to step 442. In step 442, the program determines, through input from the operator of the call center or from the modulator demodulator and the DTMF decoder circuit 212, how to dispose of the particular call. Depending on various inputs, the program will take the correct action recording and disposing of the call's activities as being, a changed, disconnected, wrong or temporarily out of service number, or if this call connected to a fax or computer.

In step 432, the program will record in a memory location on the host computer all required information pertaining to this call, such as, time of call, caller ID information, messages sent, and any telephony options invoked. The program will then update the information on the display screens of all the users in this cluster 20 through the GUI 500. All host computers, upon receiving this information will de-activate their lock out circuits 215, thereby allowing all systems access to this particular telephone line. Finally, the program will force the telephone line to go on hook using the hook and lock out circuit 215.

In step 444, the program writes all the pertinent information collected during the processing of the call to a memory location residing at a predetermined location on the host computer's mass storage device. At this point the program will terminate.

In another aspect of the telecommunications system of the present invention, call stations may be switched between receiving inbound and making outbound telephone calls as inbound and outbound call volumes dictate. For example, after an advertisement for a product first appears in the mass media, there is likely to be an influx of calls to the call center from persons ordering the product. As such, it is likely that all or nearly all of the call stations in an HCC dedicated to servicing the product will be receiving inbound calls. After a time, it would be expected that the volume of inbound calls ordering the product would decrease. Therefore, it would be desirable for the system to recognize this decreasing inbound call volume and automatically and seamlessly convert call stations in the HCC to outbound calling duties (FIG. 6) as call volume dictates such that call station operator utilization remains high, i.e., operators are not idle for prolonged periods of time between inbound phone calls.

Figure 9:
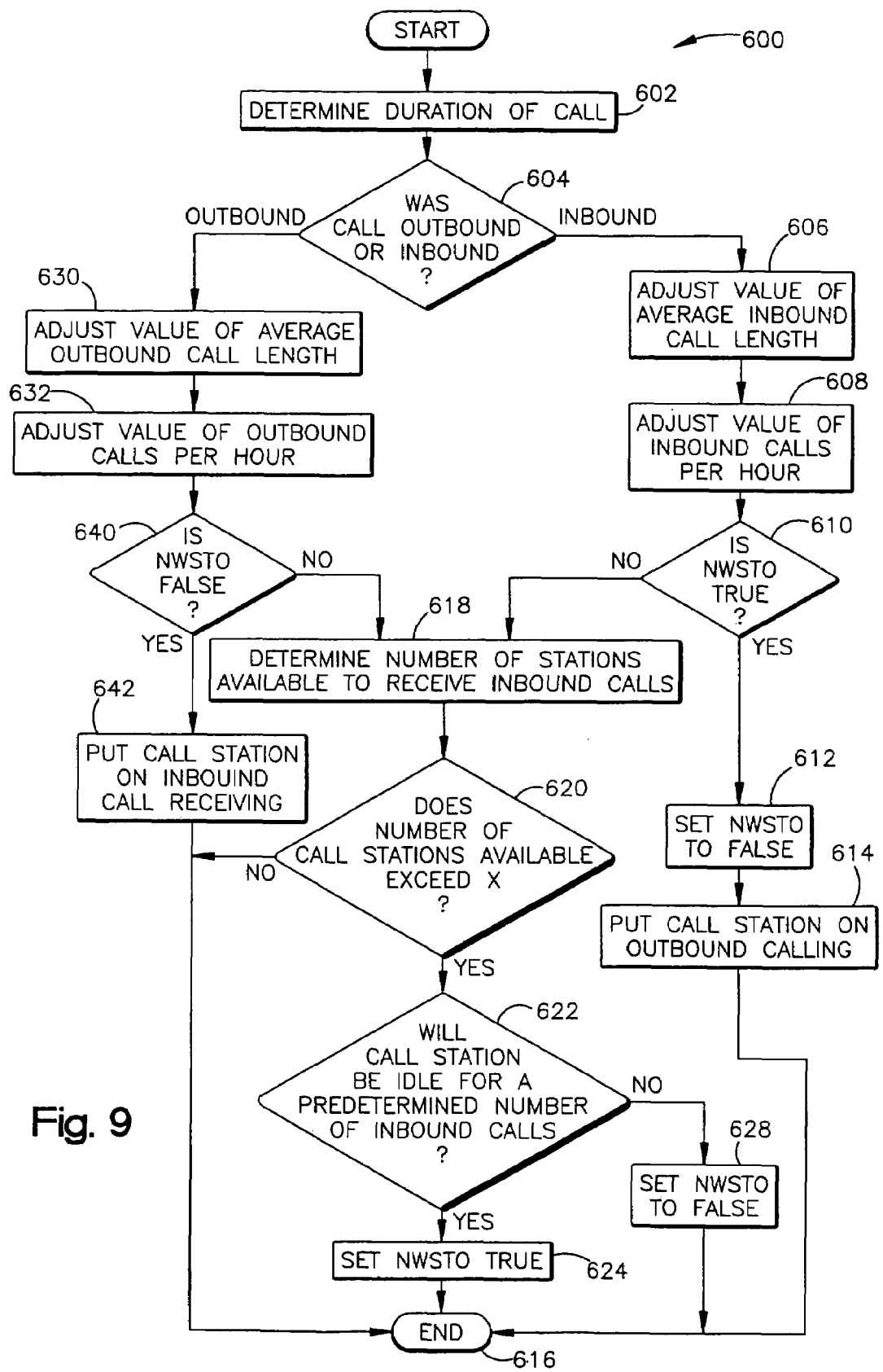
FIG. 9 is a flow chart of computer programming used in switching call stations between inbound and outbound calling duties.

In the telecommunications system 10 of the present invention, such circuitry that switches the function of a call station between receiving inbound calls and making outbound calls will be referred to as inbound/outbound flow control 180 (shown schematically in FIG. 4). The inbound/outbound flow control circuitry 180 is preferably embodied as programming resident on the hard drive of each host computer 100 in the HCC. The programming, executed by the microprocessor 170, interfaces with and receives necessary information from the STMAs associated with the host computers in the HCC. A flow chart of programming of the inbound/outbound flow control 180 is shown generally at 600 in FIG. 9.

The program is called as a subroutine when a call is terminated at the call station. In step 602, information if obtaining regarding duration of a call. At step 604, the program makes a determination as to whether the terminated call was an inbound call to the call station or an outbound call from the call station.

If the call was an inbound call, at step 606, the program uses the call duration information and recalculates a value in memory representing the average inbound call length and, at step 608, recalculates a value of inbound calls per hour for the station. At step 610, the program determines if a Boolean variable, "Next Work Station To Outbound" (NWSTO) is set to condition true. If at step 610, the variable NWSTO is found to be set to true, then, at step 612, the program sets the variable NWSTO to condition false and, at step 614, the call station is set to commence outbound calling activity. The subroutine then ends at step 616 and control is transferred to the calling program as shown in FIG. 6.

If at step 610, the program determines that the NWSTO variable is not true (that is, false), then at step 618, the program determines the number of call stations in the HCC that are available to receive inbound calls. At step 620, the program determines if the number of call stations available to receive inbound calls exceeds a predetermined value x, for example, x may be set at x=2 call stations for a particular HCC. At step 622, if the number of call stations available to receive inbound calls exceed the value of x, then the program determines if the call station will be idle for a predetermined number of inbound calls based on the current values of average inbound call length (calculated in step 606) and average inbound calls per hour (calculated in step 608). If the program determines at step 622 that the call station will be idle for a predetermined number of inbound calls (or more), then the variable NWSTO is set to true condition and the subroutine ends at step 616.

If at step 620, the program the program determines that the number of call stations available to receive inbound calls does not exceed the predetermined value x, then, the program proceeds to step 616 and ends the subroutine.

If the program determines at step 604 that the terminated call was an outbound call, then, at step 630, the program uses the call duration information and recalculates a value in memory representing the average outbound call length and, at step 632, recalculates a value of outbound calls per hour for the station. At step 640, the program determines if the variable NWSTO is set to condition false. If the variable NWSTO is set to false, then, at step 642, the call station is set to commence inbound call receiving activity. The subroutine then ends at step 616 and control is transferred to the call receiving program as shown in FIG. 5.

If, at step 640, the program determines that the variable NWSTO is not set to condition false, then, at step 618, the program determines the number of call stations available to receive incoming calls, as described above. At step 620, the program determines if the number of call stations available to receive inbound calls exceeds a predetermined value x. If the number of call stations available does exceed the predetermined value x, then, at step 622, the program determines if the call station will be idle for a predetermined number of inbound calls based on the current values of average inbound call length (calculated in step 606) and average inbound calls per hour (calculated in step 608). If the program determines at step 622 that the call station will be idle for a predetermined number of inbound calls (or more), then the variable NWSTO is set to true condition and the subroutine ends at step 616.

If at step 620, the program the program determines that the number of call stations available to receive inbound calls does not exceed the predetermined value x, then, the program proceeds to step 616 and terminates the subroutine.

Graphical User Interface

Figure 7:
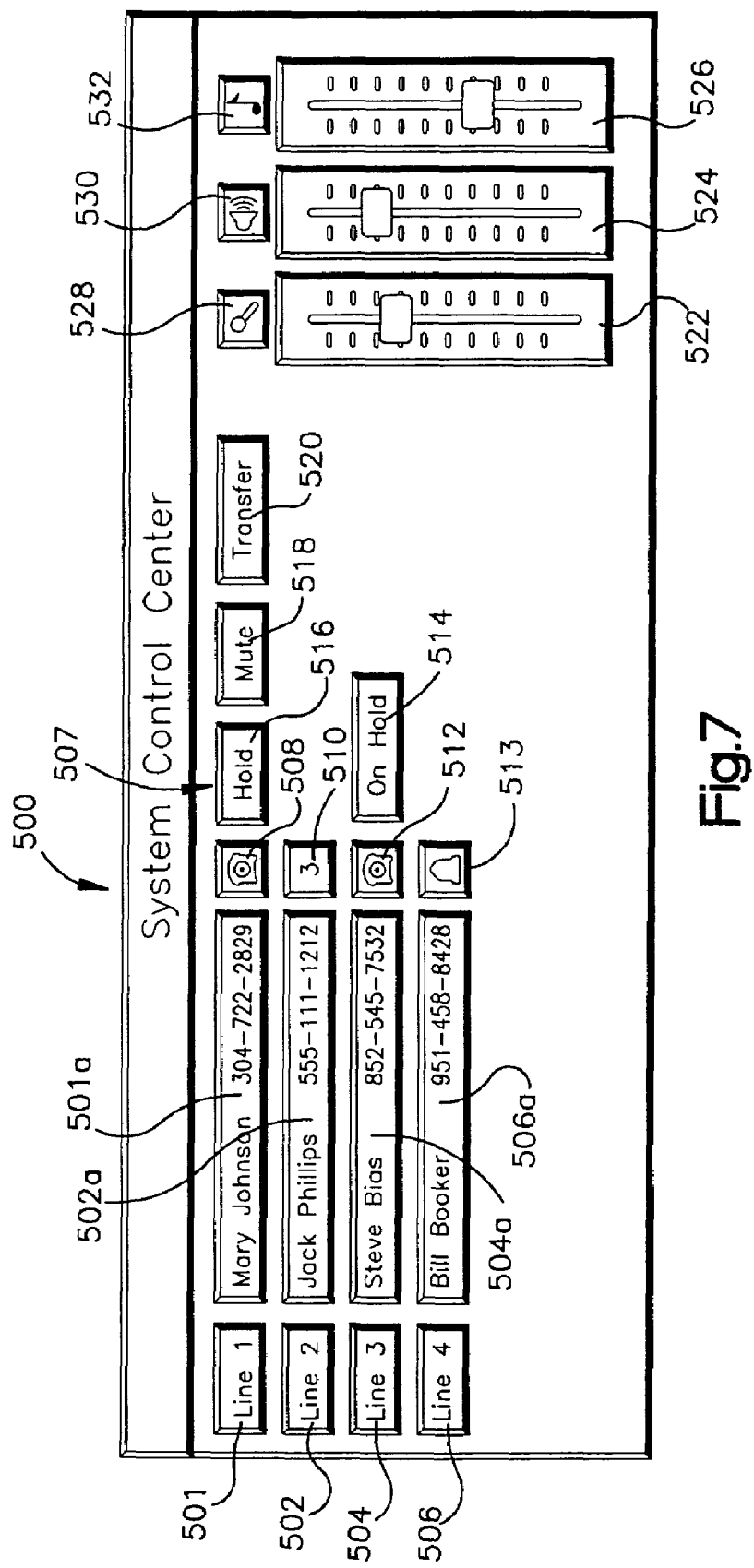
FIG. 7 is a schematic depiction of a display on a call station graphical user interface/monitor of the telecommunications system of FIG. 1.

Referring now to FIG. 7, a diagram depicting the GUI 500 of the host computer 100a. The GUI 500 is displayed on the monitor 102 of each host computer in the HCC 20a for displaying information as described above. In the present illustration, four call stations 12a, 12b, 12c, 12d are serially connected in the HCC 20a, therefore, the GUI 500 displays phone line buttons 501, 502, 504, 506 corresponding to each of the four phone lines 112, 120, 122, 124 coupled the call stations 12a, 12b, 12c, 12d of HCC 20a.

As depicted in this illustration, lines 1, 3 and 4 (phone lines 112, 120, 122) are in use or available to this operator. The line 2 icon is ghosted indicating to the operator that this line is not currently available since it is currently being used by call station 3 (12c) of the HCC 20a. These phone line icons are activated by the operator via selecting with the mouse arrow displayed on the monitor screen, to select a line on which to communicate.

The GUI 500 further displays call information in a call information display 501a, 502a, 504a, 506a for each phone line button 501, 502, 504, 506, respectively. As depicted in this illustration, the caller ID information is being displayed, however, a plurality of different information could be displayed in this area. As depicted in FIG. 7, Mary Johnson, whose phone number is displayed in the call information display 501a, is presently communicating on line 1 (phone line 112) with the operator of call station 100a.

The GUI 500 further includes an activities status area 507. As depicted in FIG. 7, line 1 (phone line 112) is currently communicating with the operator of call station 12a this workstation as indicated by the phone icon 508. Line 2 (phone line 120) is being used by the operator of call station 3 (12c) as indicated by the "3" icon 510. Therefore, although not visible in FIG. 7, the line 2 entry would be "ghosted."

Line 3 (phone line 122) has been put on hold as indicated by the phone icon 512 and the "on hold" icon 514, by the operator of either call station 12b or call station 12d. Line 4 (telephone line 124) is ringing indicated by the bell icon 516 due to an incoming call from caller Bill Booker. The activities status area 507 will change in real time to provide the call station operator a visual representation of the current status of each of the telephone lines 112, 120, 122, 124 associated with the HCC 20a.

As depicted in this illustration, the operator of call station 12a is communicating with Mary Johnson, who is on line 1. This is intuitively apparent since the line 1 icon 501 is not ghosted and Mary Johnson's name and number are clearly displayed in the information display area 500a for line 1. Next to the phone connected icon 508, there are additional option buttons available to the operator such as a hold button 516, a mute button 518, and a transfer button 520. By the same intuitive logic, it is apparent that Steve Bias who is displayed in the information display 504a for line 3, has been put on hold by the user on the call station 12c as indicated by the "on hold" icon 514.

The GUI 500 also includes volume control bars. As depicted in this illustration the operator of call station 12a is presented a graphic illustration of three volume slider controls 522, 524, 526. The operator may manipulate the controls to adjust any one of the three volume controls by using the host computer's keyboard or mouse. Again, as depicted in this illustration, above the three said slider controls, there are, from left to right, three icons 528, 530, 532 which identify the function of each slider control, respectively, to be associated with the microphone on the users acoustic transducer 108 which corresponds to volume slider control 522, the telephone line ear speaker on the users acoustic transducer 108 which corresponds to volume slider control 525, and the volume of other provided audio signals such as a music CD, the sound from a DVD, or a FM radio station which corresponds to volume slider control 526.

By presenting different icons, displaying information, and ghosting buttons, an operator of a call station will intuitively learn to operate the call station for receiving incoming call or placing outgoing calls and will advantageously be updated on what activities are occurring on the phone lines of the HCC his or her call station is a part of as well as what activities are occurring at the other work stations that are part of the HCC. The status information displayed by the GUI 500 is also very helpful for a supervisor of the HCC, sitting at his or her call station, to monitor the activities of the subordinate HCC call station operators.

Although the invention has been described with a certain degree of particularity, it should be understood that those skilled in the art can make various changes to it without departing from the spirit or scope of the invention as hereinafter claimed.

The invention claimed is:

1. A method of routing telecommunicating data in a call center telecommunication system, the steps of the method comprising
   a. providing a first call station and a second call station, the first and second call stations each including a host computer, first and second telecommunications management circuit cards, each of the first and second call stations being a coupled to first and second telephone lines, the respective first circuit cards of the first and second call stations being coupled to the first telephone line and the respective second circuit cards of the first and second call stations being coupled to the second telephone line, the first and second call stations each further including hook and lock out circuitry for blocking an inbound call ringing on one of the first and second telephone lines if the call station is on a call and inbound/outbound flow control circuitry for switching the call station between receiving inbound calls and making outbound calls based on inbound call volume;

b. determining whether the first call station is on a call utilizing the first and second telecommunications management circuit cards of the first call station;
c. determining whether the second call station is on a call utilizing the first and second telecommunications management circuit cards of the second call station;
d. routing an inbound call ringing on one of the first and second telephone lines to the first call station for answering if the first and second telecommunications management circuit cards of the first call station determine that the first call station is not on a call and the station to switched to receiving inbound calls;
f. blocking the inbound call if the first and second telecommunications management circuit cards of the first call station determine that the first call station is on a call or is switched to making outbound calls;
g. routing the inbound call to the second call station for answering if the first and second telecommunications management circuit cards of the second call station determine that the second call station is not on a call and the station to switched to receiving inbound calls; and
h. blocking the inbound call if the first and second telecommunications management circuit cards of the second call station determine that the second call station is on a call or is switched to making outbound calls.

2. A method of routing telecommunication data in a call center telecommunication system, the steps of the method comprising:

a. providing a first call station and a second call station, the first and second call stations each including a host computer, first and second telecommunications management circuit cards, each of the first and second call stations being a coupled to first and second telephone lines, the respective first circuit cards of the first and second call stations being coupled to the first telephone line and the respective second circuit cards of the first and second call stations being coupled to the second telephone line, the first and second call stations each further including hook and lock out circuitry for blocking an inbound call ringing on one of the first and second telephone lines if the call station is on a call and inbound/outbound flow control circuitry for switching the call station between receiving inbound calls and making outbound calls based on inbound call volume;
b. determining whether the first call station is on a call utilizing the first and second telecommunications management circuit cards of the first call station;
c. determining whether the second call station is on a call utilizing the first and second telecommunications management circuit cards of the second call station;
d. making an outbound call at the first call station if the first and second telecommunications management circuit cards of the first call station determine that the first call station is not on a call and the station to switched to making outbound calls; and
f. making an outbound call at the second call station if the first and second telecommunications management circuit cards of the second call station determine that the second call station is not on a call and the station is switched to making outbound calls.

\* \* \* \* \*

UNITED STATES PATENT AND TRADEMARK OFFICE
CERTIFICATE OF CORRECTION

PATENT NO. : 7,616,757 B2  Page 1 of 1
APPLICATION NO. : 10/930006
DATED : November 10, 2009
INVENTOR(S) : Joseph L. Erdman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this

Nineteenth Day of October, 2010

David J. Kappos
*Director of the United States Patent and Trademark Office*